(12) United States Patent
Richter

(10) Patent No.: US 8,437,565 B2
(45) Date of Patent: May 7, 2013

(54) ENCODING METHODS AND APPARATUS INCLUDING BUFFER RATE CONTROL

(75) Inventor: Thomas Richter, Stuttgart (DE)

(73) Assignee: Accusoft Corporation, Tampa, FL (US)

( * ) Notice: Subject to any disclaimer, the term of this patent is extended or adjusted under 35 U.S.C. 154(b) by 915 days.

(21) Appl. No.: 12/479,389

(22) Filed: Jun. 5, 2009

(65) Prior Publication Data

US 2010/0310188 A1 Dec. 9, 2010

(51) Int. Cl.
*G06K 9/00* (2006.01)
(52) U.S. Cl.
USPC .......................................................... 382/251
(58) Field of Classification Search .................... 382/251
See application file for complete search history.

(56) References Cited

U.S. PATENT DOCUMENTS

| | | | | |
|---|---|---|---|---|
| 6,778,709 | B1 * | 8/2004 | Taubman | 382/240 |
| 7,787,698 | B2 * | 8/2010 | Golla et al. | 382/232 |
| 2005/0133607 | A1 * | 6/2005 | Golla et al. | 235/494 |

OTHER PUBLICATIONS

Zeng et al., "Point-wise extended visual masking for JPEG-2000 Image Compression", IEEE Proc. of Intl. Conference on Image Processing, vol. 1, pp. 657-660, (2000).
Taubman, "High Performance Scalable Image compression with Ebcot", Proceedings of the IEEE Intl. Conf. on Image Processing, vol. 3, pp. 344-348, 1999.
Watson et al., "Visibility of Wavelet Quantization Noise", IEEE Transactions on Image Processing, vol. 6, No. 8, pp. 1164-1175, Aug. 1997.
Mazzarri et al., "Perceptual Embedded Image Coding Using Wavelet Transforms", Proc. IEEE Intl. Conference Image Processing, vol. 1, pp. 586-589, 1995.
Hontsch et al., "APIC: Adaptive Perceptual Image Coding Based on Subband Decomposition with Locally Adaptive Perceptual Weighting", Proc. of Intl. Conf. on Image Proc. 1997, vol. 1, pp. 37-40, 1997.
Chou et al., "A Perceptually Tuned Subband Image Coder Based on the Measure of Just-Noticeable-Distortion Profile", IEEE Transactions on Circuits and Systems for Video Technology, vol. 5, No. 6, pp. 467-476. Dec. 1995.
Ferwerda et al., "A Model of visual Masking for Computer Graphics", Proc. SIGGRAPH '97, pp. 143-152, 1997.
Mallat, "A Theory for Multiresolution Signal Decomposition: The Wavelet Representation", IEEE Transactions on Pattern Analysis and Machine Intelligence, vol. 11, No. 7, pp. 674-693, Jul. 1989.

(Continued)

*Primary Examiner* — John Strege
(74) *Attorney, Agent, or Firm* — Straub & Pokotylo; Michael P. Straub; Stephen T. Straub

(57) ABSTRACT

Methods and apparatus for performing image encoding and rate control as part of the image encoding process, e.g., a JPEG-2000 compliant image encoding process, are described. As part of the image encoding processes, rate control operations are performed based on rate statistic information at a point where encoded image data in selected for storage in a buffer and based on updated statistic information at a point where encoded image data is selected to be output from the buffer. The statistic information including overhead information used for rate control is also updated after formatting of data to be included in the output set of encoded image data to reflect overhead, e.g., header overhead, associated with formatting the data for storage. Encoding and rate control is applied on an ongoing basis, e.g., as portions of an image are processed, so that buffer size does not grow proportionally with the image size.

18 Claims, 3 Drawing Sheets

OTHER PUBLICATIONS

Sharifi et al., "Estimation of Shape Parameter for Generalized Gaussian Distributions in Subband Decompositions of Video", IEEE Transactions on Circuits and Systems for Video Technology, vol. 5, No. 1, pp. 52-56, Feb. 1995.

Wang et al., "Image Quality Assessment: From Error Visibility to Structural Similarity", IEEE Transactions on Image Processing, vol. 13, No. 4, pp. 600-612. Apr. 2004.

Wang et al., "Multi-Scale Structural Similarity for Image Quality Assessment", IEEE Asilomar Conference on Signals, Systems and Computers, pp. 1398-1402, 2003.

Grottke et al., "Apriori Rate Allocation in Wavelet-based Image Compression", Proc. of AXMEDIX 2006, pp. 329-336, 2006.

Wu et al., "Rate-Constrained Picture-Adaptive Quantization for JPEG Baseline Coders", ICASSP-93, vol. 5, pp. V-389-V392, 1993.

Taubman, "High Performance Scalable Image Compression with EBCOT", IEEE Transactions on Image Processing, vol. 9, No. 7, pp. 1158-1170, 2000.

Daly, "Application of a noise-adaptive contrast sensitivity function to image data compression", SPIEE, vol. 29, No. 8, pp. 977-987, Aug. 1990.

N. Otsu, "A Threshold Selection Method from Gray-Level Histograms", IEEE Transactions on Systems, Man, and Cybernetics, vol. SMC-9, No. 1, pp. 62-66, Jan. 1979.

R.M. Haralick, S.R. Sternberg, X. Zhuang, "Image Analysis Using Mathematical Morphology", IEEE Transactions on Pattern Analysis and Machine Intelligence, vol. PAMI-9, No. 4, pp. 532-550, Jul. 1987.

S.R. Sternberg, "Grayscale Morphology", Computer Vision, Graphics and Image Processing, vol. 35, No. 3, pp. 333-355, Sep. 1986.

A. Morales, R. Acharya, and S.J. Ko, "Morphological Pyramids with Alternating Sequential Filters", IEEE Transactions on Image Processing, vol. 4, No. 7, pp. 965-977, Jul. 1995.

J. Gil and R. Kimmel, "Efficient Dilation, Erosion, Opening, and Closing Algorithms", IEEE Transaction on Pattern Analysis and Machine Intelligence, vol. 24, No. 12, pp. 1606-1617, Dec. 2002.

J. Gil and M. Werman, "Computing 2-D Min, Median, and Max Filters", IEEE Transaction on Pattern Analysis and Machine Intelligence, vol. 15, No. 5 pp. 504-507, May 1993.

D.S. Bloomberg, "Multiresolution Morphological Approach to Document Image Analysis", ICDAR, pp. 1-12, 1991.

Y.M.Y. Hasan and L.J. Karam, "Morphological Text Extraction from Images", IEEE Transactions on Image Processing, vol. 9, No. 11, pp. 1978-1983, Nov. 2000.

M. Cumplido, P. Montolio, and A. Gasull, "Morphological Preprocessing and Binarization for OCR Systems", in Mathematical Morphology and Its Applications to Signal Processing, P.A. Margos, R.W. Schafer, and M.A. Butt, Eds., pp. 393-400, Springer, 1996.

I. Pitas, "Fast Algorithms for Running Ordering and Max/Min Calculation", IEEE Transactions on Circuits and Systems, vol. 36, No. 6, , pp. 795-804, Jun. 1989.

E. Urbach and M. Wilkinson, "Efficient 2-D Grayscale Morphological Transformations With Arbitrary Flat Structuring Elements", IEEE Transactions on Image Processing, vol. 17, No. 1, pp. 1-8, Jan. 2008.

* cited by examiner

ENCODING METHODS AND APPARATUS INCLUDING BUFFER RATE CONTROL

FIELD OF THE INVENTION

The present invention relates to encoding methods and, more particularly, methods and apparatus for implementing buffer rate control as part of an image encoding process.

BACKGROUND

The price of memory has dropped considerably in recent years. As a result, computers are being sold with ever greater amounts of memory. However, there remains a need for limiting, e.g., bounding, the amount of memory that may be used by a particular application, e.g., an image encoding application. By limiting the amount of memory required for an application, it makes it possible for the application to run in a predicable manner without concerns of running out of sufficient memory.

Image encoding can be a memory intensive process. The temporary buffering of image data, e.g., transform coefficients or other values used to represent an image, can involve vast amounts of data and thus require significant amounts of memory particularly if the image is large or is of very high resolution. Much of the image data which is buffered as part of an image encoding processes may be discarded and not included in the final set of image data output by the encoding processes, e.g., due to an image rate constraint which may be expressed as a total amount of memory, e.g., 10 MB, which is available to store the final set of encoded image data.

In many encoding applications it would be best if an image could be fully encoded and then data selected from the full set of encoded image data for inclusion in the final set of encoded image data. Such an approach allows for careful selection of the final encoded image data based on the knowledge about the encoded image data produced for the entire image. Unfortunately, in encoding embodiments where a complete image is processed and then a subset of the encoded data generated as part of the processing is selected to be included in the final encoded image data set, the amount of memory required for encoding grows in a manner which is normally proportionally to the image size. For large images the buffering requirements may exceed the amount of memory generally available in a personal computer and/or other system which may be used to perform the encoding.

Thus, as a practical matter, when encoding large or high resolution images which result in the generation of large amounts of data, it is often desirable from a memory management perspective to generate encoded image data corresponding to a portion of an image, store the generated encoded image data in a buffer, select some of the encoded image data to be included in the final set of encoded image data and discard the buffered encoded image data which has not been selected to be included in the final set of encoded image data. When such an approach is used, the amount of memory required for buffering image data as part of the encoding processes can be limited and need not grow in a manner which is proportional to the image size. This is because the full set of encoded image data generated as part of the process of encoding an image need not be stored at a single time. This allows large images to be encoded, e.g., a piece at a time, and/or images to be encoded in real time as portions of the image to be encoded, e.g., pixel values corresponding to a portion of the image, are received over a communications channel.

In order to control the amount of data stored, e.g., buffered, as part of an image encoding processes there is a need for buffer control methods and apparatus which can control the rate at which data is stored and removed from a buffer. While this might sound like a simple task, buffer rate control is complicated by the encoding objective of achieving a desired coding rate, e.g., bits per image portion, given a data constraint for the size of the encoded set of data representing the image while requiring image quality optimization. Mathematically, this is an optimization under constraints problem.

In view of the above discussion, it should be appreciated that there is a need for encoding methods and apparatus which incorporate rate control as well as buffering control features which allow for the encoding of large and/or high resolution images without concern that the size of the image being processed might cause a memory or buffer overflow.

SUMMARY

Figure 1:
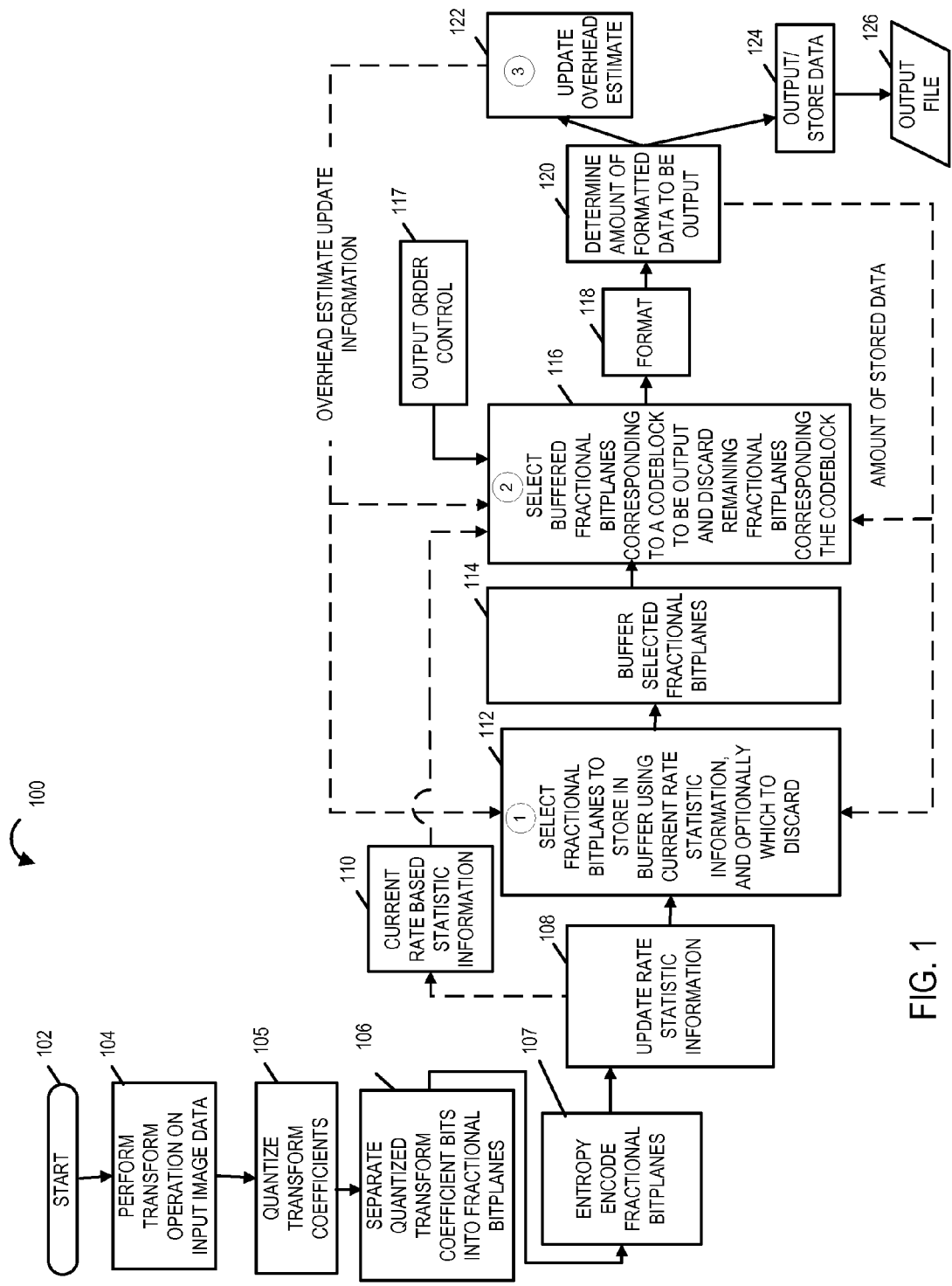
FIG. 1 illustrates an exemplary method, implemented in accordance with the invention, of generating a set of encoded image data representing an image from an input set of image data.

Methods and apparatus for performing image encoding and rate control as part of the image encoding process, e.g., a JPEG-2000 compliant image encoding process, are described. While described in the context of a JPEG-2000 image encoding example, it is to be appreciated that the methods and apparatus described herein are applicable to a wide range of applications including applications which may use transforms other than the wavelet transform used in JPEG-2000.

As part of encoding, the image is subject to a transform operation, e.g., a wavelet transform operation in the case of JPEG-2000, on image data in the form of pixel values, which produces transform coefficients. The transform coefficients are then normally quantized. For processing purposes the transform coefficients are divided into non-overlapping sets, e.g., corresponding to codeblocks in the case of JPEG-2000.

The processing of the sets of data corresponding to codeblocks proceeds on a per codeblock basis. It is worthwhile to note that the order in which codeblocks are encoded may be different from the final order in which they are stored in an output file. The output order may depend on one or more encoder settings, e.g., codeblock ordering settings, while the input processing order will normally proceed sequentially based on the input image content.

As part of the processing of the transform coefficients corresponding to a codeblock, the transform coefficient data is quantized. The bits of the quantized coefficients are then separated into fractional bitplanes. Each fractional bitplane includes one or more bits, where each bit is from a different quantized transform coefficient. For example, a first bitplane may include the first order bit of each of a plurality of different quantized transform coefficients but not more than one bit from each quantized coefficient. While a fractional bitplane may include one bit from each transform coefficient of a codeblock, the coefficients corresponding to a particular bitplane are often separated into multiple different sets with each set representing a portion, i.e., fraction, of the full set of bits corresponding to the particular bitplane. Hence the term "fractional bitplane" is used to indicate that the fractional bitplane may include bits from less than all the quantized coefficients of a codeblock. The function used to perform the separating, e.g., scanning, of quantized coefficient bits to fractional bitplanes may be any one of a plurality of known functions including functions such as those used in conventional JPEG 2000 encoders. After separation of quantized coefficient bits into fractional bitplanes, the entropy encoding is performed.

The entropy coded coefficient values separated into the fractional bitplanes are then analyzed, e.g., using known analysis techniques such as those described in *Apriori Rate Allocation in Wavelet-Based Image Compression*, Grottke, S.; Richter, T.; Seiler, R.; Automated Production of Cross Media Content for Multi-Channel Distribution, 2006. AXMEDIS '06. Second International Conference on 13-15 Dec. 2006 Page(s):329-336, AXMEDIS.2006.12, which describes the joint work of Grottke, Richter and Seiler. Based on the analysis, rate statistics, e.g., in the form of a rate table indicating the relationship between fractional bit planes, data rates and image distortion, is updated. In this manner, as the entropy coded quantized coefficient values corresponding to each codeblock are processed, rate statistics information indicating the fractional bitplanes which should be selected when encoding a codeblock to achieve a desired entropy encoded quantized coefficient data rate for the codeblock while satisfying a quality constraint, is updated.

In this manner, the rate statistics information used for encoding an image is refined and updated, on a per codeblock basis, as the quantized coefficients of additional codeblocks are processed. As the updating continues, the rate statistics information will normally improve in accuracy over time as it is updated based on greater knowledge of the image being encoded.

A buffer input control routine is implemented in a buffer input control module. The buffer input control module determines which of the generated fractional bit planes are to be stored in a buffer for consideration for inclusion in the final encoded image, e.g., as stored in an output file. The buffer input control routine makes the decision in step 112, identified as processing point 1 in FIG. 1, regarding which fractional bit planes of a codeblock are to be stored based on a target input data rate, e.g., a rate which may be expressed in terms of bits per codeblock. The target input data rate is determined based on the space per code block available for storing encoded data corresponding to the codeblock, the estimated overhead associated with storing the transform coefficients selected to be included in the output set of image data, and a margin used to allow for leeway at the output of the buffer for selecting which bitplanes of a codeblock are included in the final set of encoded data used to represent the image being encoded. While space or data per codeblock is discussed, it should be appreciated that this is equivalent or the same as data per a number of pixels since the number of pixels per codeblock is normally fixed and constant throughout an image.

Thus, the buffer input control module controls the number of bit planes which are stored at a given time to prevent buffer overflow while taking into consideration a target output rate and a quality constraint. Bitplane data selected to be stored in the buffer is stored in the buffer while the extra bitplane data corresponding to a codeblock being processed at processing point 1 is discarded.

A buffer output control routine implemented in a buffer output control module is used to determine which of the buffered bit planes are included in the final encoded image taking into consideration the current information in the rate statistic information and an output target rate, e.g., per codeblock, which may depend on the amount of data which has already been output for inclusion in the final set of encoded image data. As noted above, the codeblock output order may be different from the order in which the codeblocks are stored in the buffer. By the time the buffer output decision is made, the rate statistic information which is used for both buffer input and buffer output decisions may have been updated multiple times based on information corresponding to codeblocks stored in the buffer subsequent to the storage of the codeblock for which bitplanes are to be output. The buffer output decision is made at what may be called processing point 2.

The bitplane output decision is made based on the most recently updated version of the rate statistic information and the currently available information on the amount of data which is available for storing data corresponding to each codeblock which has not yet been output, e.g., in final form to the file used to store the encoded image data. As part of the buffer output decision process, bitplanes corresponding to the codeblock to be output are selected based on the information in the current rate statistic information and the bitplane data, e.g., transform coefficient values, corresponding to the selected bitplanes are output from the buffer. Bitplane data corresponding to the codeblock being output which does not correspond to the selected bitplanes is discarded. In this manner processing point 2 acts as the final control point for which transform coefficient data is to be included in the output file for a particular codeblock.

The transform coefficient data, e.g., transform coefficient values, corresponding to a codeblock which is selected at processing point 2 is output from the buffer and formatted. Formatting includes adding information to the encoded data identifying the transform coefficients and providing other information useful to a decoder for interpreting and using the coefficient data at decoding time. Thus, as part of the formatting, there is some overhead data added to the encoded transform coefficients. The amount of overhead data added as part of the formatting depends, in many encoding systems, based on the transform coefficients being encoded and/or the which transform coefficients were previously selected to be included in the encoded data corresponding to the last codeblock which was processed. Thus, at processing points 1 and 2, it may, and often is not possible to determine the final amount of overhead which will be associated with the transform coefficients included in the output of the encoding process corresponding to each codeblock.

Following formatting of the selected bitplane data output from the buffer, the actual amount of data to be stored for the current codeblock is determined. This amount includes the amount of data corresponding to the bitplane data and the associated overhead, e.g., formatting or framing information which is stored with the bitplane data for the codeblock being output. At this point, the amount of data for storing the data corresponding to remaining codeblocks, used at processing points 1 and 2 can be, and in some embodiments is, updated. In addition, the estimate of the amount of overhead associated with each codeblock can, and in many embodiments is, updated based on the amount of overhead associated with the codeblock being output. In this manner, the remaining space available for storing the data corresponding to the remaining portion of the image and the expected per codeblock overhead are updated and refined as the encoding of individual codeblocks is completed.

In some embodiments, at one or more points during the processing the extra amount of data per codeblock stored in the buffer at processing point one is revised. In some embodiments, if too much data is being stored in the file because of errors in the estimates at processing point 2, the amount of extra data which is factored into the storage decision at processing point 1 is increased, thereby giving processing point 2 greater control of selecting what bitplane data is stored by increasing the number of bitplane selection combinations that are possible at processing point 2. In this manner greater control of the storage decision can be provided to processing point 2. This update may occur, in some embodiments, where the buffer naturally empties as a result of the output of all the codeblocks stored in the buffer. Similarly, if the output targets are being reached consistently the extra amount of data stored in the buffer on a per codeblock basis may be decreased to avoid having a buffer larger than required. In some embodiments the update includes resetting the rate statistics information.

The methods and apparatus of the present invention address and balance the difficulties in storing all fractional bitplanes corresponding to an entire image prior to deciding which ones to include in an output file which can be computationally and memory intensive for large images with the need to achieve a particular level of image quality and a desired data rate in a reasonable amount of time given limited processing and/or memory resources.

DETAILED DESCRIPTION

Figure is a flowchart 100 illustrating the steps of an exemplary method implemented in accordance with one aspect of the invention. The operation of the exemplary method starts in step 102. In start step image data, which maybe coefficient values or coefficient indexes corresponding to an image to be encoded, is received or retrieved from memory for processing. Next, in step 104 a transform operation, e.g., a wavelet transform operation in the case of JPEG-2000, is performed on the input image data thereby producing transform coefficients. In some embodiments, for processing purposes the transform coefficients are divided into non-overlapping sets, e.g., corresponding to codeblocks, e.g., in the case of JPEG-2000. In some embodiments the processing of the sets of data corresponding to codeblocks proceeds from step 104 on a per codeblock basis with the transform coefficients of different codeblocks being processed in sequence.

Operation proceeds from step 104 to step 105 wherein the transform coefficients are subject to a quantization operation, as part of the processing of the transform coefficients corresponding to a codeblock. The quantization operation performed in step 105 produces a set of quantized coefficients corresponding to the codeblock being processed. As discussed above, the data corresponding to the individual codeblocks are processed sequentially.

Operation proceeds from step 105 to step 106 wherein the transformed quantized coefficient bits of the quantized transform coefficients generated in step 105 for a codeblock, are separated into fractional bitplanes. Each fractional bitplane includes one or more bits, where each bit is from a different quantized transform coefficient. In some embodiments the function used to perform the separation, e.g., scanning, of quantized coefficient bits to fractional bitplanes may be any one of a plurality of known functions including functions such as those used in conventional JPEG 2000 encoders.

Operation proceeds from step 106 to step 107. In step 107 the fractional bitplanes are encoded using, e.g., entropy encoding. The entropy encoded coefficients are then analyzed, e.g., using known analysis techniques, in step 108 to produce rate statistic information. In step 108, based on the analysis, rate statistics information 110, e.g., in the form of a rate table or set of information indicating the relationship between fractional bit planes, data rates and image distortion, is updated. Thus, as the entropy coded quantized coefficients corresponding to each codeblock are processed, the rate statistics information 110 indicating the fractional bitplanes which should be selected when encoding a codeblock to achieve a desired entropy encoded quantized coefficient data rate for the codeblock while satisfying a distortion constraint, is updated. As the updating continues, e.g., as additional codeblocks are processed, the rate statistics information 110 will normally improve in accuracy over time as it is updated based on greater knowledge of the image being encoded.

Operation proceeds from step 108 to step 112 wherein a buffer input control module determines and selects, based on the current rate statistic information 110, the fractional bitplanes, of the codeblock being processed, to be stored in a buffer for consideration for inclusion in the final encoded image and, optionally, which of the fractional bitplanes to discard. The buffer input control module makes the decision in step 112, identified as processing point 1 in FIG. 1, regarding which fractional bit planes of the codeblock being processed are to be stored based on a target input data rate, e.g., a rate which may be expressed in terms of bits per codeblock. In some embodiments the target input data rate is determined based on the space per codeblock available for storing encoded data corresponding to the codeblock, the estimated overhead associated with storing the quantized transform coefficients selected to be included in the output set of image data, and a margin used to allow for leeway at the output of the buffer for selecting which bitplanes of a codeblock are included in the final set of encoded data used to represent the image being encoded. The margin may be expressed in terms of bits per codeblock or some other data measure. Thus, the buffer input control module controls the number of fractional bitplanes which are stored at a given time to prevent buffer overflow while taking into consideration a target output rate and a quality constraint.

Operation proceeds from step 112 to step 114. In step 114 the fractional bitplanes selected to be stored in the buffer are stored in the buffer while the extra fractional bitplanes corresponding to a codeblock being processed at processing point 1 are discarded. Operation proceeds from step 114 to step 116 where a buffer output control module selects which of the buffered fractional bitplanes are to be included in the final encoded image taking into consideration the current rate statistic information 110 and an output target rate, e.g., per codeblock, which may depend on the amount of data which has already been output for inclusion in the final encoded image. It should be appreciated that the codeblock output order may be different from the order in which the codeblocks are stored in the buffer. The output order is determined by output order control step 117 which is implemented by a control module based on one or more encoder settings which determine the order in which codeblocks are to be output for storage in the final set of encoded image data.

As will be appreciated from the discussion which follows, by the time the buffer output decision is made, the rate statistic information which is used for both buffer input and buffer output decisions may, and normally will, have been updated multiple times based on information corresponding to codeblocks stored in the buffer subsequent to the storage of the codeblock for which fractional bitplanes are to be output. In the present example, the buffer output decision is made at what may be called processing point 2 shown in the flowchart 100. Fractional bitplanes corresponding to the codeblock being output which does not correspond to the selected fractional bitplanes are discarded. Thus in some embodiments, processing point 2 acts as the final control point for which entropy coded quantized transform coefficients are to be included in the output file for a particular codeblock.

Operation proceeds from step 116 to step 118. In step 118 the fractional bitplanes corresponding to a codeblock which are output from the buffer are formatted. Formatting includes adding information to the encoded data identifying the quantized transform coefficients and providing other information useful to a decoder for interpreting and using the coefficient data at decoding time. Thus, as part of the formatting, there is some overhead data added to the encoded quantized transform coefficients. The amount of overhead data added as part of the formatting depends, in many encoding systems, based on the quantized transform coefficients being encoded and/or which quantized transform coefficients were previously selected to be included in the encoded data corresponding to the last codeblock which was processed. Thus, at processing points 1 and 2, it may, and often is not possible to determine the final amount of overhead which will be associated with the quantized transform coefficients included in the output of the encoding process corresponding to each codeblock.

Operation proceeds from step 118 to step 120. In step 120, following formatting of the selected fractional bitplanes output from the buffer, the actual amount of data to be stored for the current codeblock is determined. This amount includes the amount of data corresponding to the fractional bitplanes and the associated overhead, e.g., formatting or framing information which is stored with the fractional bitplanes data for the codeblock being output. At such a point, the amount of data for storing the data corresponding to remaining codeblocks, used at processing points 1 and 2 can be, and in some embodiments is, updated. The updating is shown in step 122, which is indicated as control point 3, wherein the estimate of the amount of overhead associated with each codeblock is updated based on the amount of overhead associated with the codeblock being output and the updated overhead information is used to update the rate statistic information 110. In this manner, the remaining space available for storing the data corresponding to the remaining portion of the image and the expected per codeblock overhead are updated and refined as the encoding of individual codeblocks is completed.

In addition to proceeding to step 122 from step 120, operation also proceeds from step 120 to step 124. Thus it should be appreciated that steps 122 and 124 may occur in parallel. In step 124 the formatted data is output and/or stored. Operation then proceeds from step 124 to step 126 where the final image file including the full set of encoded image data representing the same image as the input image data is output.

In addition to being output, e.g., transmitted to another device such as an image decoder or transmission site, in some embodiments the method involves decoding and displaying of the encoded image data thereby allowing an operator of an encoding apparatus implementing the invention to view a decoded and displayed version of the image. Thus a user of the encoding system can see the quality of the encoded image. The image may be an image of a real world object such as a person, house or other physical object, e.g., an image originally captured by a camera or other sensing device.

Figure 2:
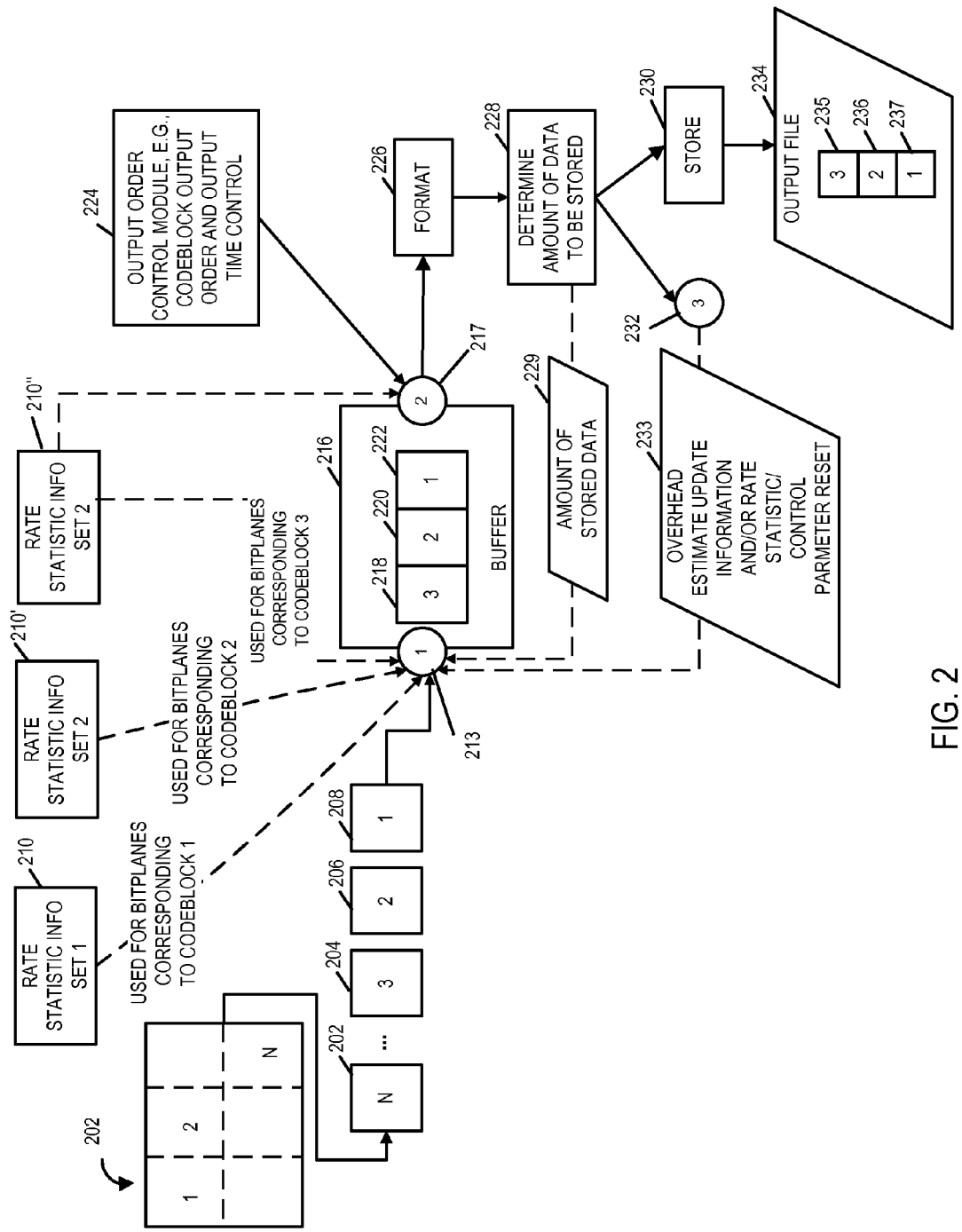
FIG. 2 illustrates the processing and storing of image data in one exemplary embodiment in which the method of FIG. 1 is used.

FIG. 2 illustrates data and rate statistic information generated while encoding an exemplary image. Note that the example shown in FIG. 2 assumes that codeblock data corresponding to codeblocks is read out in a different order than the order in which it is stored in buffer 216. Codeblock data is stored in the order in which the codeblocks are initially processed, e.g., codeblock data 222 corresponding to codeblock 1 is stored, then codeblock data corresponding to codeblock 2 is stored, then codeblock data corresponding to codeblock 3 is stored. However, codeblocks are read out of buffer in a different sequence, e.g., codeblock 3, then codeblock 2 then codeblock 1 data is read out. This sequences is reflected in the final codeblock order shown in output file 234 where encoded data 235 corresponding to codeblock 3 is included before codeblock data 236 corresponding to codeblock 2 and codeblock data 237 corresponding to codeblock 1.

In FIG. 2, element 202 represents N sets of fractional bitplane data, each set of fractional bitplane data corresponding one of the N codeblocks. The sets of data 203, 204, 206, 208 corresponding to individual codeblocks are processed sequentially at control point 2 where a decision is made, on a per codeblock basis, as to what fractional bitplane data should be stored. Rate statistic information 210 is used for making the decision for codeblock 1 208 at processing point 1 identified by reference number 213. However, rate statistic information 2 210', which has been updated based on information from both the first and second codeblocks, is used for making the decision at point 1 for the second codeblock 206. Rate statistic information set 3 210" is used at decision point 1 for making the storage decision with regard to the third codeblock 204. It should be appreciated that rate statistic information sets 2 and 3 (210' and 210") represent updated versions of the rate statistic information set 1 210. Thus, as additional codeblocks are processed, the rate statistic information used to make a data selection at control point 1 is updated and improved decisions become possible.

At processing point 2 identified by reference number 217, data is selected under control of output order control module 224 which determines the time and order at which data corresponding to different codeblocks is output based on one or more encoder settings.

Note that at control point 2, the most current rate statistic information table 210" available at the time data is selected to be output is used for making the selection of which fractional bitplanes corresponding to a codeblock being output should be included in the final encoded image. Thus, at processing point 2 in the FIG. 2 example, rate statistic information set 3 210" is used in determining which data to keep and which data to discard when data is output from buffer 216 for each of codeblocks 3, 2, 1. As the selected data corresponding to a codeblock is output from control point 2, it is format in step 226 and then the amount of data to be stored is determined at point 228 which corresponds to step 120. Once the amount of data to be stored is determined at point 228, stored information indicating the amount of data which has been stored is updated so that the processing decision at step 1 can accurately reflect the amount of data which remains available for storing the portion of the encoded image data which has not already been formatted and sent for storage in the output set of encoded image data.

At proceeding point 3 (232) which corresponds to step 122 of FIG. 1, overhead information and/or a rate table rest is triggered and the operation is performed at processing point 233. The data is then output or stored at processing point 230 which corresponds to step 124 of the FIG. 1 example. The data may be stored in memory, e.g., in an output file 234 which corresponds to file 126 of the FIG. 1 example. Thus, various updates of the rate statistic information and resetting of various control parameters occurs as shown in FIG. 2.

Figure 3:
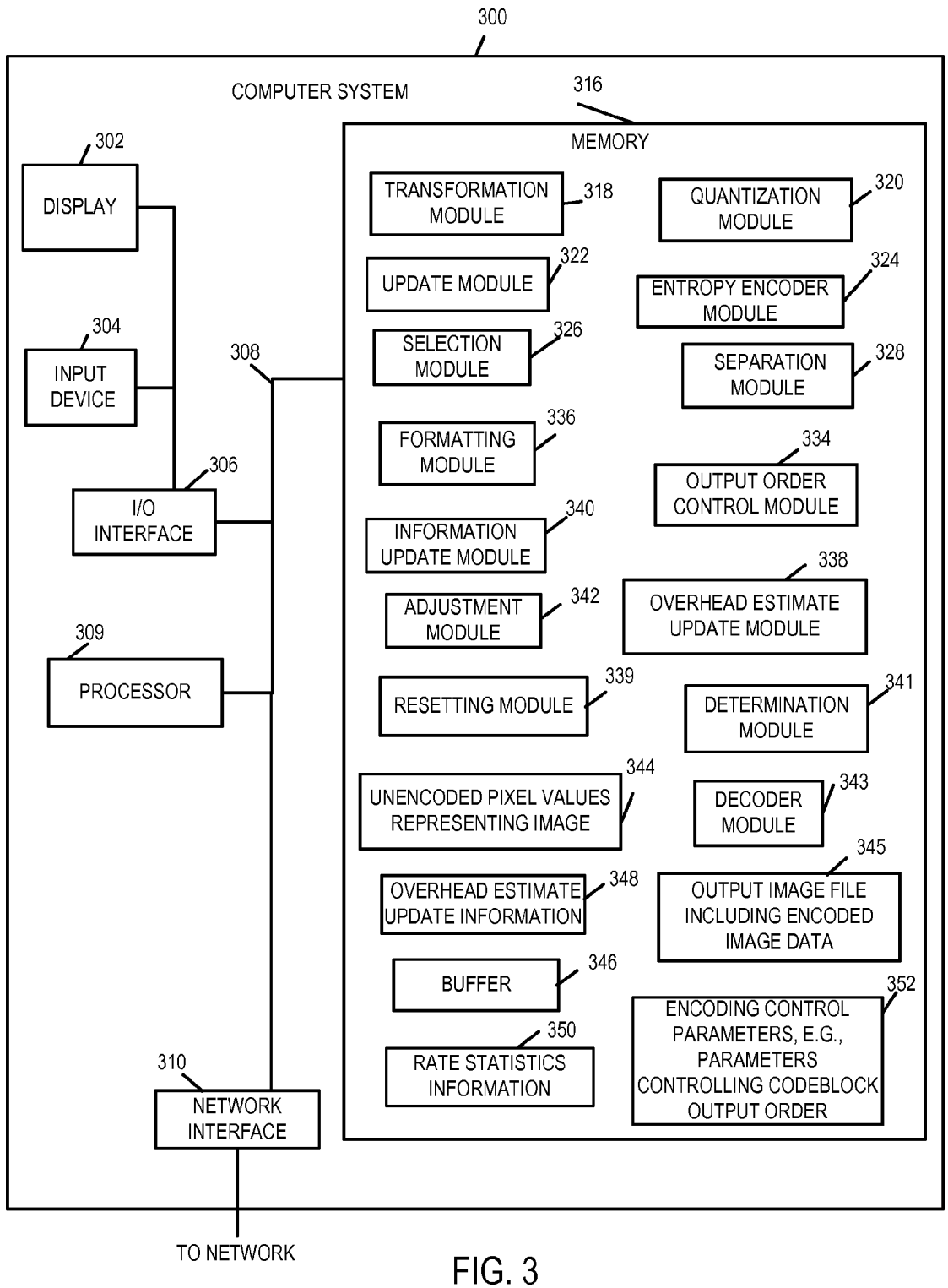
FIG. 3 illustrates a computer system implemented in accordance with the invention which can perform the encoding method shown in FIG. 1.

FIG. 3 illustrates a computer system 300 capable of implementing the encoding methods of the present invention. The system 300 includes a display device 302, and an input device 304 which are coupled to a bus 308 via an I/O (input/output) interface 306. The system 300 further includes a processor 309, network interface 310 and a memory 316 which are coupled together and to the I/O interface by bus 308. Image data to be encoded can be received by the network interface 310, e.g., from a network. In addition encoded image data generated in accordance with the invention can be sent to another device, e.g., a playback device including a decoder, a transmitter or a storage device via the network interface 310.

In addition to including a buffer 346 the memory includes a module for performing each of the steps illustrated in FIG. 1. In addition, the memory includes a decoder module 342 for decoding and outputting for display to the display device 302 image data encoded in accordance with the present invention. As shown in FIG. 3, memory 316 further includes a transformation module 318, a quantization module 320, an update module 322, an entropy encoder module 324, a selection module 326, a separation module 328, an output order control module 334, a formatting module 336, an overhead estimate update module 338, an information update module 340, a determination module 341, an adjustment module 342 and a decoder module 343. The memory 316 further includes data/information including unencoded pixel values representing image 344, an output image file 345 including encoded image data, overhead estimate update information 348, rate statistics information 350 and encoding control parameters 352.

The transformation module 318 performs a transform operation, e.g., a wavelet transform operation, on the input image data thereby producing transform coefficients. The quantization module 320 is configured to perform a quantization operation on the transform coefficients, as part of the processing of the transform coefficients corresponding to a codeblock, and produces a set of quantized coefficients corresponding to the codeblock being processed. The separation module 328 is configured to separate quantized coefficient data corresponding to codeblocks into fractional bitplanes. The data corresponding to codeblocks is processed sequentially so the separation module 328 is configured to separate the quantized transform coefficient bits of the first codeblock into a plurality of fractional bitplanes and is configured to then separate quantized coefficient data corresponding to the second codeblock to a plurality of fractional bitplanes. The entropy encoder module 324 is configured to encode fractional bitplanes, e.g., fractional bitplanes supplied by said separation module 328, using entropy encoding. The update module 322, which is a rate statistic information update module in some embodiments, is configured to update rate statistic information based on quantized coefficient data, e.g., entropy coded quantized coefficient data corresponding to a first codeblock and subsequent codeblocks. Thus, rate statistics information 350 is stored in the memory, and is updated by the update module 322 as processing proceeds. The update module 322 performs, among other things, the update described with respect to update rate statistic information step 108. Since the update module 322 sequentially processes codeblocks, it is configured to update said rate statistic information based on quantized coefficient data corresponding to a second codeblock after updating the information based on the first codeblock. Selection module 326 is responsible for performing the buffer input selection described with respect to step 112 shown in FIG. 1, e.g., on sequential codeblocks as they are processed. Accordingly, the selection module 326 is configured to select a first set of fractional bitplanes for storage in the buffer corresponding to the first codeblock based on rate statistic information updated based on quantized coefficient data corresponding to the first codeblock and a codeblock overhead estimate. The selection module 326 will then select a first set of fractional bitplanes corresponding to the second codeblock to store in the buffer based on said rate statistic information after it is updated by said update module 322 based on quantized coefficient data corresponding to the second codeblock. The selection and updating process will proceed as codeblocks are processed, data is selected, and the selected data is stored in the buffer. The selection module 326 is also responsible for controlling buffer output and handles the selection performed in step 116. In some embodiments, different selection modules are provided to perform the buffer input data selection performed in step 112 and the buffer output data selection performed in step 116. In some embodiments the selection module 326 is configured to select data to be stored in the buffer as a function of a margin value used to make sure more data is stored than is expected to actually be included in the final output file. This allows some data selection to be implemented at the buffer output with the excess data being discarded from the buffer.

In the embodiment where the selection module 326 is used to handle the data selection at the buffer output, e.g., the selection performed in step 116, the selection module 326 is further configured to select a second set of fractional bitplanes corresponding to the first codeblock to be output from the buffer 346 as a function of the current, e.g., updated, rate statistic information at the time an output decision is made. The order in which data corresponding to codeblocks is output can, and in some embodiments is, different from the order in which codeblock data is stored in the buffer. Accordingly, in at least one embodiment where codeblock data is output in a different order than then the order in which it is stored, the selection module 326 is configured to select, to be output, a second set of fractional bitplanes corresponding to the second codeblock, prior to selecting a second set of fractional bitplanes corresponding to the first codeblock to be output.

The output order of the codeblocks from the buffer 346 is determined by the output order control module 334 based on one or more encoder settings which determine the order in which codeblocks are to be output for storage in the final set of encoded image data. The encoding control parameters 352 include control parameters, reflecting encoder settings, and are used by the output order control module 334 for deciding codeblock output order.

The formatting module 336 is configured to format data, e.g., encoded fractional bitplanes, e.g., the data selected in step 116, as the data is output from the buffer. The formatting adds information that may be required by a decoder to interpret and use the data output by the buffer. The formatting module 118 works on the data corresponding to codeblocks in the order it is output from the buffer. Thus, in the case where second codeblock data is output prior to first codeblock data, the formatting module 336 is configured to format the second set of fractional bitplanes corresponding to the second codeblock and then the second set of fractional bitplanes corresponding to the first codeblock.

The overhead estimate module 338 performs the processing described with regard to step 122, e.g., on a codeblock by codeblock basis. Overhead estimate update information 348 which is stored in memory is the output from the overhead estimate update module 338. In some embodiments the overhead estimate update module 338 is configured to update the codeblock overhead estimate based on the amount of data, e.g., framing overhead, added to the second set of fractional bitplanes corresponding to the second codeblock in formatting step 118, and to update the codeblock overhead estimate based on the amount of data added to the second set of fractional bitplanes corresponding to the first codeblock which may be output from the buffer after the second codeblock.

The information update module 340 performs the determination and update of the information indicating the amount of data stored, e.g., as described with regard to step 120. The stored amount of data may be included in memory with statistic information 110. Module 340 updates the stored information indicating the amount of data included in an encoded image being output based on the amount of data added to the second set of fractional biplanes corresponding to the second codeblock and the amount of data included in said second set of fractional bitplanes. A similar update is made for the first codeblock.

Adjustments to the margin value used by selection module 326 to control the amount of data selected for storage in the buffer 346 may be made over time as statistic information for the image is updated. The time at which such adjustments are made may vary depending on the implementation. However, in some embodiments margin adjustments are made when the buffer 346 is empty.

Determination module 341 is configured to determine if the amount of data included in the encoded image output exceeds a target amount based on the total amount of data available for encoding the portion of the image for which data has been included in the encoded image output. Adjustment module 342 is configured to adjust the data margin value based on the determination made by said determination module 341. In some embodiments the adjustment module 342 is configured to adjust said data margin value at a point at which said buffer is empty. In some embodiments the adjustment module 342 increases said data margin value and thereby causes the selection of additional data on a per codeblock basis for storage in the buffer 346, in response to said determination module 341 determining that the amount of data included in the encoded image output file exceeds the target amount. The resetting module 339 is configured, in some but not all embodiments, to reset said rate statistic information 350 at a point at which said buffer is empty. The decoder module 343 is used for decoding encoded data which can then be displayed by the display device 302.

While the system 300 includes various modules for performing the steps of the method shown in FIG. 1, it also stores, in some embodiments, both the unencoded image data and encoded image data. In some but not all embodiments, the input pixel values representing the image are stored in module 344 which includes a set of pixel values corresponding to the received input image being processed. The output image file 345 corresponds to output file 126 shown in FIG. 1 and includes encoded image data which is the output at the completion of encoding performed in accordance with the invention. It should be appreciated that storage of the full set of unencoded image data and/or encoded image data in the system 300 performing the encoding is not required. In fact, in some embodiments the computer system 300 includes an image retrieval module that is able to retrieve an image from a storage medium, such as a hard disk, CDROM or sensor, which maybe internal or external to the computer system or even from a communications network through which image data to be processed can be supplied to the computer system and encoded image data can be output.

Some embodiments are directed a computer readable medium embodying a set of software instructions, e.g., computer executable instructions, for controlling a computer or other device to encode and store an image in accordance with the present invention. The encoded image may, and in some embodiments is, decoded and displayed. In other embodiments the set of encoded image data generated in accordance with the invention is stored and/or stored and then transmitted for decoding and display.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of encoding a portion of an image represented by quantized coefficient data, the method comprising:
updating rate statistic information based on quantized coefficient data corresponding to a first codeblock;
selecting a first set of fractional bitplanes corresponding to the first codeblock to store in a buffer based on rate statistic information updated based on quantized coefficient data corresponding to the first codeblock, a data margin value, and a codeblock overhead estimate;
storing said selected first set of fractional bitplanes in said buffer;
updating said rate statistic information based on quantized coefficient data corresponding to a second codeblock;
selecting a second set of fractional bitplanes corresponding to the second codeblock to be output from the buffer as a function of the updated rate statistic information;
formatting the second set of fractional bitplanes corresponding to the second codeblock;
updating the codeblock overhead estimate based on the amount of data added to the second set of fractional bitplanes corresponding to the second codeblock;
updating information indicating the amount of data included in an encoded image output based on the amount of data added to the second set of fractional biplanes corresponding to the second codeblock by said formatting and the amount of data included in said second set of fractional bitplanes;

determining if the amount of data included in the encoded image output exceeds a target amount based on the total amount of data available for encoding the portion of the image for which data has been included in the encoded image output;

adjusting said data margin value based on said determination; and selecting a second set of fractional bitplanes corresponding to the first codeblock to be output from the buffer as a function of the updated rate statistic information and said updated information indicating the amount of data included in the encoded image output.

2. The method of claim 1, wherein said first set of fractional bitplanes corresponding to the first codeblock include entropy coded data.

3. The method of claim 1, further comprising:

prior to updating said rate statistic information based on quantized coefficient data corresponding to a first codeblock, separating quantized coefficient data corresponding to the first codeblock to a plurality of fractional bitplanes.

4. The method of claim 3, further comprising:

prior to updating said rate statistic information based on quantized coefficient data corresponding to a second codeblock, separating quantized coefficient data corresponding to the second codeblock to a plurality of fractional bitplanes.

5. The method of claim 1, further comprising, prior to selecting a second set of fractional bitplanes corresponding to the first codeblock to be output:

selecting a first set of fractional bitplanes corresponding to the second codeblock to store in the buffer based on said rate statistic information after said updating based on quantized coefficient data corresponding to the second codeblock.

6. The method of claim 5, wherein said first set of fractional bitplanes corresponding to the first codeblock include entropy coded data; and wherein said first set of fractional bitplanes corresponding to the second codeblock include entropy coded data.

7. The method of claim 1, wherein selecting a second set of fractional bitplanes corresponding to the first codeblock is also performed as a function of the updated codeblock overhead estimate.

8. The method of claim 1, wherein adjusting said data margin value is performed at a point at which said buffer is empty.

9. The method of claim 3, further comprising:

resetting said rate statistic information at a point at which said buffer is empty.

10. The method of claim 1, wherein adjusting said data margin includes:

increasing said data margin value to cause the selection of additional data on a per codeblock basis for storage in said buffer, in response to determining that the amount of data included in the encoded image output file exceeds the target amount.

11. An apparatus for encoding a portion of an image represented by quantized coefficient data, comprising:

an update module configured to update rate statistic information based on quantized coefficient data corresponding to a first codeblock;

a selection module configured to select a first set of fractional bitplanes corresponding to the first codeblock based on rate statistic information updated based on quantized coefficient data corresponding to the first codeblock, a data margin value, and a codeblock overhead estimate;

a buffer for storing said selected first set of fractional bitplanes;

wherein said update module is further configured to update said rate statistic information based on quantized coefficient data corresponding to a second codeblock;

wherein said selection module is further configured to select a second set of fractional bitplanes corresponding to the second codeblock to be output from the buffer as a function of the updated rate statistic information, the apparatus further comprising:

a formatting module configured to format the second set of fractional bitplanes corresponding to the second codeblock;

an overhead estimate update module configured to update the codeblock overhead estimate based on the amount of data added to the second set of fractional bitplanes corresponding to the second codeblock;

an information update module configured to update information indicating the amount of data included in an encoded image output based on the amount of data added to the second set of fractional biplanes corresponding to the second codeblock by said formatting module and the amount of data included in said second set of fractional bitplanes;

a determination module configured to determine if the amount of data included in the encoded image output exceeds a target amount based on the total amount of data available for encoding the portion to the image for which data has been included in the encoded image output;

an adjustment module configured to adjust said data margin value based on said determination made by said determination module; and wherein said selection module is further configured to select a second set of fractional bitplanes corresponding to the first codeblock to be output from the buffer as a function of the updated rate statistic information and said updated information indicating the amount of data included in the encoded image output.

12. The apparatus of claim 11, further comprising:

a separation module configured to separate quantized coefficient data corresponding to the first codeblock to a plurality of fractional bitplanes before said update module updates said rate statistic information based on quantized coefficient data corresponding to a first codeblock.

13. The apparatus of claim 12, wherein said separation module is further configured to separate quantized coefficient data corresponding to the second codeblock to a plurality of fractional bitplanes before said update module updates said rate statistic information based on quantized coefficient data corresponding to a second codeblock.

14. The apparatus of claim 11, wherein said selection module is further configured to select, prior to selecting a second set of fractional bitplanes corresponding to the first codeblock to be output, a first set of fractional bitplanes corresponding to the second codeblock to store in the buffer based on said rate statistic information after it is updated by said update module based on quantized coefficient data corresponding to the second codeblock.

15. The apparatus of claim 11, wherein said selection module is further configured to select said second set of fractional bitplanes corresponding to the first codeblock as a function of the updated codeblock overhead estimate.

16. The apparatus of claim 11, wherein said adjustment module is configured to adjust said data margin value at a point at which said buffer is empty.

17. An apparatus for encoding a portion of an image represented by quantized coefficient data, comprising:
   means for updating rate statistic information based on quantized coefficient data corresponding to a first codeblock;
   means for selecting a first set of fractional bitplanes corresponding to the first codeblock based on rate statistic information updated based on quantized coefficient data corresponding to the first codeblock, a data margin value, and a codeblock overhead estimate;
   buffer means for storing said selected first set of fractional bitplanes;
   wherein said means for updating also updates said rate statistic information based on quantized coefficient data corresponding to a second codeblock;
   wherein said means for selecting are also for selecting a second set of fractional bitplanes corresponding to the second codeblock to be output from the buffer as a function of the updated rate statistic information, the apparatus further comprising:
   means for formatting the second set of fractional bitplanes corresponding to the second codeblock;
   overhead estimate update means for updating the codeblock overhead estimate based on the amount of data added to the second set of fractional bitplanes corresponding to the second codeblock;
   information update means for updating information indicating the amount of data included in an encoded image output based on the amount of data added to the second set of fractional biplanes corresponding to the second codeblock by said means for formatting and the amount of data included in said second set of fractional bitplanes;
   means for determining if the amount of data included in the encoded image output exceeds a target amount based on the total amount of data available for encoding the portion to the image for which data has been included in the encoded image output;
   means for adjusting said data margin value based on said determination made by said means for determining; and
   wherein said means for selecting is also for selecting a second set of fractional bitplanes corresponding to the first codeblock to be output from the buffer as a function of the updated rate statistic information and said updated information indicating the amount of data included in the encoded image output.

18. A non-transitory computer readable medium including computer executable instructions for controlling a computer to encode a portion of an image represented by quantized coefficient data, said non-transitory computer readable comprising:
   instructions for causing the computer to update rate statistic information based on quantized coefficient data corresponding to a first codeblock;
   instructions for causing the computer to select a first set of fractional bitplanes corresponding to the first codeblock based on rate statistic information updated based on quantized coefficient data corresponding to the first codeblock, a data margin value, and a codeblock overhead estimate;
   instructions for causing the computer to store said selected first set of fractional bitplanes in a buffer;
   instructions for causing the computer to update said rate statistic information based on quantized coefficient data corresponding to a second codeblock;
   instructions for causing the computer to select a second set of fractional bitplanes corresponding to the second codeblock to be output from the buffer as a function of the updated rate statistic information;
   instructions for causing the computer to format the second set of fractional bitplanes corresponding to the second codeblock;
   instructions for causing the computer to update the codeblock overhead estimate based on the amount of data added to the second set of fractional bitplanes corresponding to the second codeblock;
   instructions for causing the computer to update information indicating the amount of data included in an encoded image output based on the amount of data added to the second set of fractional biplanes corresponding to the second codeblock by said formatting module and the amount of data included in said second set of fractional bitplanes;
   instructions for causing the computer to determine if the amount of data included in the encoded image output exceeds a target amount based on the total amount of data available for encoding the portion to the image for which data has been included in the encoded image output;
   instructions for causing the computer to adjust said data margin value based on said determination made by said determination module; and
   instructions for causing the computer to select a second set of fractional bitplanes corresponding to the first codeblock to be output from the buffer as a function of the updated rate statistic information and said updated information indicating the amount of data included in the encoded image output.

* * * * *